United States Patent
Straub, Jr. et al.

[11] Patent Number: 6,020,388
[45] Date of Patent: Feb. 1, 2000

[54] METHODS FOR IMPREGNATING POLYMER BEADS

[75] Inventors: Richard F. Straub, Jr., Mason; Daniel J. Keck, Cincinnati, both of Ohio

[73] Assignee: Tri-Technologies, Inc., Lebanon, Ohio

[21] Appl. No.: 08/810,426

[22] Filed: Mar. 4, 1997

[51] Int. Cl.⁷ .................................................. C08J 9/18
[52] U.S. Cl. ..................... 521/60; 264/50; 521/56
[58] Field of Search ..................... 264/50; 521/56, 521/60

[56] References Cited

U.S. PATENT DOCUMENTS

| | | |
|---|---|---|
| 3,821,342 | 6/1974 | Hurd . |
| 4,080,344 | 3/1978 | Ikeda et al. . |
| 4,361,656 | 11/1982 | Mostafa . |
| 4,532,094 | 7/1985 | Wu et al. ................................ 264/53 |
| 4,550,003 | 10/1985 | Sakata et al. . |
| 4,721,731 | 1/1988 | Mori et al. . |
| 5,086,078 | 2/1992 | Harclerode et al. ...................... 521/60 |
| 5,128,380 | 7/1992 | Mori et al. . |
| 5,132,330 | 7/1992 | Ueda et al. . |
| 5,525,639 | 6/1996 | Keneko et al. . |
| 5,580,503 | 12/1996 | Hall, III et al. . |
| 5,703,135 | 12/1997 | Schweinzer et al. ..................... 521/60 |

FOREIGN PATENT DOCUMENTS

| | | | |
|---|---|---|---|
| 53-4872 | 2/1978 | Japan ......................... 521/56 |
| 62-13441 | 1/1987 | Japan ......................... 521/56 |
| 64-45607 | 2/1989 | Japan ......................... 521/56 |
| 2-305831 | 12/1990 | Japan ......................... 521/60 |
| 3-68637 | 3/1991 | Japan ......................... 521/56 |

*Primary Examiner*—Allan R. Kuhns
*Attorney, Agent, or Firm*—Dinsmore & Shohl LLP

[57] ABSTRACT

Methods for impregnating polymer beads comprise providing polymer beads in an impregnation chamber at a temperature from about 150° F. to about 200° F. and a pressure of from about 25 psig to about 100 psig, and simultaneously fluidising the polymer beads in the impregnation chamber with an impregnating gas. The gas is delivered to the chamber at a rate sufficient to cause individual polymer beads to be fluidised and for a time sufficient to impregnate the gas in the polymer beads. The apparatus adapted for such methods includes a heater, a compressor and a plurality of vents for supplying a gas to the impregnating chamber to fluidise polymer beads contained therein simultaneously with the heating and pressurising of the beads.

12 Claims, 2 Drawing Sheets

METHODS FOR IMPREGNATING POLYMER BEADS

FIELD OF THE INVENTION

The present invention is directed to methods and apparatus for impregnating polymer beads, particularly for preparing expandable polymer beads which are suitable for forming foamed polymer articles. The methods and apparatus of the present invention are specifically directed to systems employing an impregnating gas.

BACKGROUND OF THE INVENTION

Methods of forming expandable polymer beads or pellets which are suitable for forming shaped foamed polymer articles are known in the art. For example, the Ikeda et al U.S. Pat. No. 4,080,344 discloses methods for the production of expandable ethylenically unsaturated polymer particles from ethylenically unsaturated polymer particles by suspending the particles in water and impregnating the particles with an organic expanding agent having a boiling point lower than the softening point of the polymer particles. Ikeda et al include a suspension stabilizer comprising calcium carbonate particles having resin acid-treated surfaces in the particle-water suspension.

The Sakata et al U.S. Pat. No. 4,550,003 generally discloses additional methods for incorporating a blowing agent such as Freon into resin particles using gas phase or liquid phase impregnation methods wherein the resin particles are impregnated in an autoclave with a liquid or gaseous blowing agent, under pressurization if desired, and in-water suspension impregnation methods in which resin particles are suspended in water and impregnated with a blowing agent. Sakata et al also disclose that expandable resin particles may be prepared by effecting polymerization in the presence of a blowing agent.

The Hall, III et al U.S. Pat. No. 5,580,503 discloses another conventional method for preparing expandable polymer beads wherein a slurry of thermoplastic minipellets containing a blowing agent is pumped through a series of impregnation vessels at a predetermined pressure and temperature and for a sufficient time to allow the blowing agent to impregnate the thermoplastic particles. The slurry is typically formed of water, thermoplastic minipellets and optionally a dispersing agent and/or a surface active agent. Additional methods for preparing expandable polymer particles or beads are disclosed in the Keneko et al U.S. Pat. No. 5,525,639, the Ueda et al U.S. Pat. No. 5,132,330, the Mori et al U.S. Pat. Nos. 5,128,380 and 4,721,731, and the Mostafa U.S. Pat. No. 4,361,656.

As is known in the art, expandable impregnated polymer beads or pellets may be used to prepare shaped foamed polymer particles. Generally, a rate limiting step in the production of shaped foamed polymer articles from expandable polymer beads or pellets is the time required to impregnate the polymer beads or pellets with a liquid or gaseous blowing agent. Accordingly, there is a continuing need to develop improved methods and/or apparatus for preparing expandable polymer particles in a reduced time. However, many prior efforts to reduce the time required to prepare the expandable polymer beads or pellets by reducing the time required for impregnating either a gaseous or liquid blowing agent have resulted in products which exhibit material degassing, i.e., loss of the impregnated blowing agent, thereby causing the material to collapse. Accordingly, there is a continuing need for improving methods and apparatus for preparing expandable polymer particles in the form of beads, pellets or the like.

SUMMARY OF THE INVENTION

It is therefore an object of the present invention to provide methods and apparatus which overcome various disadvantages of the prior art More particularly, it is an object of the present invention to provide improved methods and apparatus for impregnating polymer beads to provide expandable polymer beads which are suitable for forming shaped foamed polymer articles.

It is a further object of the invention to provide improved methods and apparatus which may be used to impregnate polymer beads in a shorter process time as compared with various conventional methods and apparatus for impregnating polymer beads.

These and additional objects and advantages are provided by the methods and apparatus for impregnating polymer beads according to the present invention. In one embodiment, the methods for impregnating polymer beads according to the present invention comprise providing polymer beads in an impregnation chamber at a temperature of from about 150° F. to about 200° F. and a pressure of from about 25 psig to about 100 psig, and fluidizing the polymer beads in the impregnation chamber with an impregnating gas. The impregnating gas is delivered to the chamber at a rate sufficient to cause individual polymer beads to be fluidized and for a time sufficient to impregnate the gas in the polymer beads. By fluidizing the polymer beads with the impregnating gas, the polymer beads may be individually treated with the impregnating gas, thereby improving the rate at which the polymer beads are impregnated with the gas and improving the efficiency of the impregnating method.

In another embodiment of the invention, the apparatus for impregnating polymer beads comprise an impregnating chamber for receiving polymer beads to be impregnated, a heater for heating polymer beads in the impregnating chamber, a compressor for pressurizing the interior of the impregnating chamber simultaneously with heating of polymer beads contained in the chamber, and a plurality of vents for supplying a gas to the impregnating chamber to fluidize polymer beads contained therein simultaneously with the heating and pressurizing of the polymer beads. The simultaneous heating, pressurization and fluidization of the polymer beads which is achieved using the apparatus of the present invention result in improved rates for impregnating the polymer beads with the gaseous blowing or expansion agent.

These and additional objects and advantages according to the present invention will be more fully apparent in view of the following detailed description.

BRIEF DESCRIPTION OF THE DRAWINGS

The following detailed description will be more fully understood in view of the drawings in which.

DETAILED DESCRIPTION

Figure 1:
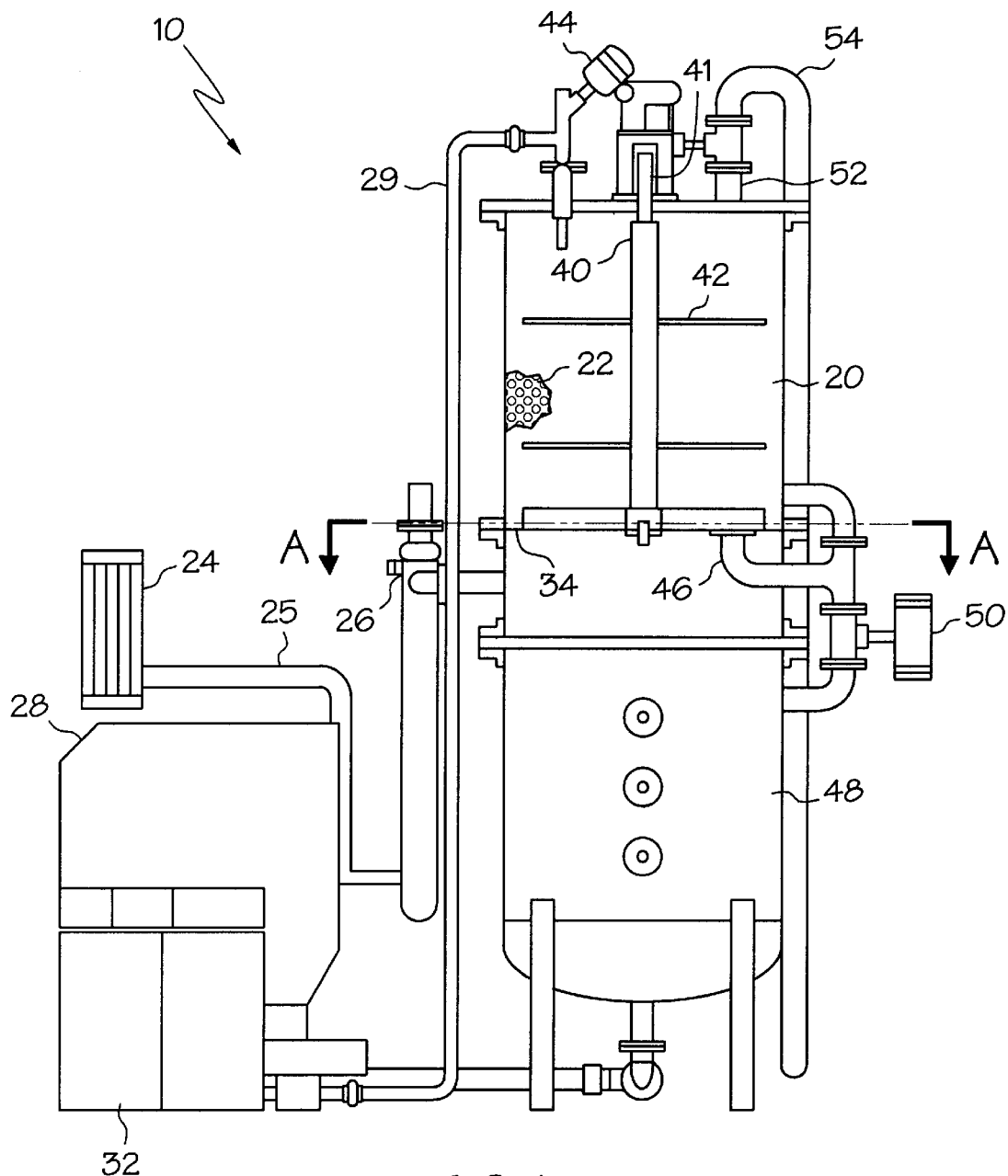
FIG. 1 is a schematic view of an apparatus according to one embodiment of the invention.

The present invention is directed to methods and apparatus for impregnating polymer beads, and particularly to methods and apparatus for impregnating polymer beads with an impregnating gas to form expandable polymer beads which are suitable for use in forming shaped foamed polymer articles and the like.

The polymer beads which may be employed in the methods and apparatus of the present invention may be formed of any expandable or foamable polymer material. Suitable polymers which may be used to form the polymer beads include, but are not limited to, styrene polymers, styrene copolymers, polyolefin polymers, polyolefin copolymers, polyamides, polyesters, polyurethanes, or mixtures thereof. Preferred polymer beads for use in the methods and apparatus of the present invention include those formed from one or more ethylenically unsaturated polymers such as the styrene and polyolefin polymers and copolymers, or formed from blends containing one or more of these polymers or copolymers. As styrene polymers, there can be employed polystyrene, poly-2-methylstyrene, styrene-maleic anhydride copolymers, polyphenylene oxide-polystyrene blends, styrene-acrylonitrile copolymers, acrylonitrile-butadiene-styrene terpolymers, styrene-butadiene copolymers and the like. As polyolefin polymers, there can be employed crosslinked or non-crosslinked polyolefins including polyethylene, for example low density, linear low density or medium density polyethylene, polypropylene, ethylenepropylene copolymers, for example of either the random or block type, propylenebutene copolymers, for example propylene-butene random polymers, propylene-ethylene-butene copolymers, for example propylene-ethylene-butene random copolymers, ethylene-vinyl acetate copolymers, ethylene-methyl methacrylate copolymers, silane-modified propylene copolymers, ionomer resins such as ionomer resins of ethylene-methacrylic acid copolymer crosslinked with a metal ion in its molecule, poly-1-butene, polypentene, and the like. These polymers and copolymers may be used alone or in combination.

The polymer particles employed in the methods and apparatus of the present invention are referred to herein generically as polymer beads. The polymer beads may be in any form or shape, e.g., spherical, ellipsoid, cylindrical, cube, rectangular or the like. The size of the polymer beads employed in the methods and apparatus of the present invention are similarly not critical and generally will have an average diameter of about 4 mm to 10 mm. The weight of the polymer beads will, of course, vary depending on the polymer material from which the beads are formed, but generally will be in the range of from about 0.5 g to about 5 g. As one skilled in the art will appreciate, the polymer beads for use in the methods and apparatus of the present invention may be formed by any method conventionally employed in the art, for example, by extrusion.

In accordance with an important feature of the methods and apparatus of the invention, the polymer beads are impregnated with a gas and, in contrast to many methods of the prior art, the impregnation according to the present invention is performed in the absence of a liquid suspension or slurry. Rather, according to the present methods, the polymer beads are simultaneously heated and pressurized and fluidized with the impregnating gas. The simultaneous treatment allows the polymer beads to be individually impregnated with the gas at an improved rate, thereby reducing the overall time for preparation of expandable polymer beads.

In accordance with preferred embodiments of the present methods, polymer beads are provided in the impregnation chamber at a temperature and pressure sufficient to effect impregnation once the polymer beads are fluidized by the impregnating gas. Preferably, the polymer beads are provided at a temperature of from about 150° F. to about 200° F., more preferably from about 175° F. to about 185° F. and most preferably at about 180° F. The polymer beads are also pressurized at greater than atmospheric pressure, preferably at a pressure of about 25 psig or greater. The methods of the present invention are suitably conducted at pressures of from about 25 psig to about 100 psig. Pressures of from about 25 to about 30 psig are suitable for providing a lower grade expandable polymer bead, for example a bead which is advantageous for use in preparing expanded foam packaging materials. On the other hand, pressures of from about 40 to about 50 psig or greater are suitable for providing expandable polymer beads which are advantageous for preparing high grade foamed polymer materials, for example those commonly employed in various applications in the automotive industry. Intermediate pressures of from about 30 to about 40 psig are suitable for use in preparing medium grade expandable polymer beads which, for example, are advantageous for use in preparing medium grade foamed polymer articles and materials.

The choice of impregnating gas or gaseous blowing agent which is employed in the methods of the invention will be made based on the composition of the polymer bead and the desired use for the resulting expandable impregnated polymer bead. While conventional impregnating gases may employed, including those of the Freon type and the conventional hydrocarbon type, such as pentane or butane, the methods and apparatus of the present invention are particularly suitable for use with an impregnating gas comprising air, oxygen, carbon dioxide, or mixtures thereof, with air being a preferred impregnating gas. The use of a filtered source of air is particularly preferred in order to ensure the production of an uncontaminated expandable polymer bead product.

The polymer beads are heated and pressurized, for example, in a chamber or reactor, and simultaneously the impregnating gas is delivered to the polymer beads at a rate sufficient to cause individual polymer beads in the chamber or reactor to be fluidized. Preferably, all of the polymer beads are fluidized by the impregnating gas. This fluidization allows the polymer beads to be impregnated with the gaseous blowing agent on an individual basis rather than as a mass of beads, thereby resulting in impregnation of the polymer beads with the gaseous blowing agent in a reduced amount of time, particularly as compared with various conventional methods. As will be discussed in further detail with respect to the apparatus according to the present invention, the impregnating gas preferably is delivered to a chamber of volume V at a rate of about V/minute. For example, the impregnating gas preferably is delivered to a chamber having a volume of approximately 100 cubic feet at a rate of from about 75 cubic feet per minute to about 125 cubic feet per minute, and more preferably at a rate of about 100 cubic feet per minute, thereby completing a volume through flow of impregnating gas through the chamber in about a minute. At these gas delivery rates, the polymer beads are sufficiently impregnated with the impregnating gas to form expandable polymer beads in a period of from about 10 minutes to about 2 hours, and more preferably, in a period of from about 20 minutes to about 40 minutes.

In one embodiment, the fluidized polymer beads which are contacted with the impregnating gas may also be subjected to simultaneous mechanical agitation. However, such mechanical agitation is generally not necessary in order to achieve sufficient levels of impregnation according to the methods and apparatus of the invention. If mechanical agitation is employed, the mechanical agitation is provided in such a manner that mechanical abrasion or degradation of the polymer beads is avoided. Preferably, any mechanical agitation which is provided during the fluidization step is with a rotary agitator operated at a speed of not greater than about 80 rpm.

The impregnated polymer beads which result from the methods according to the present invention are suitable for use in forming shaped foamed polymer articles and materials in accordance with conventional foaming and molding methods. The impregnated polymer beads resulting from the present methods may be forwarded directly to a shaped mold for further processing according to such conventional methods, or may be stored or transported for an extended period of time prior to use in molding and foaming processes.

One embodiment of an apparatus suitable for use in the methods of the present invention is set forth in FIG. 1. With reference to FIG. 1, reference numeral 10 generally designates an apparatus according to the present invention for impregnating polymer beads. The apparatus includes an impregnation chamber 20, in which polymer beads, shown at 22, are impregnated with an impregnating gas. The apparatus includes a heater and a compressor, shown schematically at 24 and 28, respectively. The heater 24 communicates with the interior of the impregnation chamber 20 via lines 25, 26, 27. The compressor 28 communicates with the impregnation chamber 20 via line 29. In order to conduct the methods as described above for impregnating polymer beads, the heater 24 preferably is capable of heating the contents of the chamber 20 to a temperature in the range of from about 150° F. to about 200° F. and the compressor 28 preferably is capable of effecting pressures within the chamber 20 in the range of from about 25 psig to about 100 psig, with the heating and pressurization being conducted simultaneously. Appropriate control means shown schematically at 32 may be included in the apparatus to allow adjustment and control of the heat and pressure conditions within the impregnation chamber.

The impregnation chamber 20 is provided with a bottom plate 34 having a plurality of core vents 36 for supplying an impregnating gas to the chamber. The vents are suitably sized for providing air streams to fluidize the polymer beads. In a preferred embodiment, each core vent has an inside diameter of from about 10 to about 20 millimeters, and more preferably each core vent is about 13 millimeters in diameter. A top view of the plate 34 is shown schematically in FIG. 2 which shows that the plate 34 is also provided with an outer perimeter of securing holes 38 for securing the plate at its periphery in the lower portion of the impregnation chamber 20. In one embodiment, the plate 34 has a 4-foot diameter and contains approximately 500 of the vents 36 for supplying an impregnating gas to the chamber 20. In order that the apparatus is suitable for use in practicing the methods of the present invention, the vents 36 are required to be of a size and number sufficient to supply the impregnating gas to the chamber at a rate which will cause individual polymer beads 22 to be fluidized. Preferably, for a chamber 20 of volume V, the rate of gas delivery is V/minute. More preferably, for a chamber 20 of a size of about 100 cubic feet, the vents allow delivery of the impregnating gas to the chamber at a rate of from about 75 cubic feet per minute to about 125 cubic feet per minute. In a further preferred embodiment, substantially all the polymer beads 22 are fluidized by the impregnating gas, i.e., at least about 80 weight percent of the polymer beads are fluidized by the impregnating gas.

Mechanical agitation means may be included in the impregnation chamber 20, for example in the form of a rotary mixer shown at 40 in FIG. 1. The rotary mixer 40 includes a shaft 41 provided with impellers 42 and driven by a motor 44 at a speed which is sufficiently low to prevent mechanical degradation or abrasion to the polymer beads 22 contained in the chamber. Preferably, the rotary mixer 40 is rotated at a speed not greater than about 80 rpm.

Figure 2:
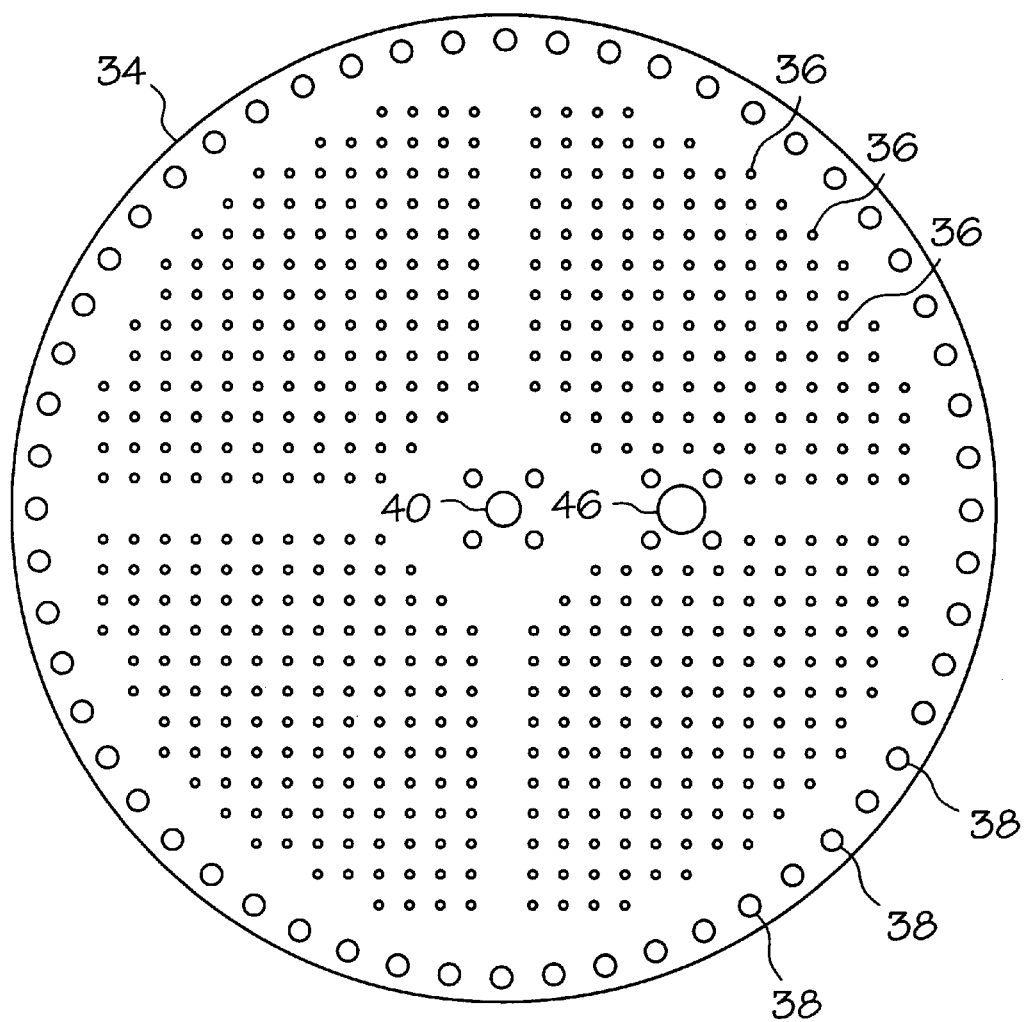
FIG. 2 is a schematic view taken along line A—A of FIG. 1.

As shown in FIG. 2, the lower plate 34 further includes an impregnation chamber discharge outlet 46 through which impregnated polymer beads may be discharged. The discharge outlet 46 is suitably in communication with a holding chamber 48 via a ball valve 50 for controlling discharge of polymer beads from the impregnating chamber 20 into the holding chamber 48. The holding chamber 48 is arranged substantially below the impregnation chamber 20 and preferably maintains the impregnated polymer beads at a pressure which is approximately one-half the pressure in the impregnating chamber. From the holding chamber 48, the impregnated polymer beads may be directed to a conventional shaped mold for forming a shaped foam polymer article or material, or the expandable polymer beads may be discharged for storage and/or transport.

The impregnation chamber 20 is further provided with one or more exhaust vents 52 through which unused impregnating gas is exhausted from the impregnating chamber. The unused impregnating gas exhausted from the impregnation chamber may be vented directly to the atmosphere or may be recycled for further use in the impregnating methods, for example via a line 54 to the impregnating chamber 20.

The methods and apparatus of the present invention are illustrated by the following example.

EXAMPLE

An apparatus as shown in FIG. 1 was employed to impregnate polypropylene beads with air. The impregnating chamber which was employed had a diameter of approximately four feet and a volume of approximately 100 cubic feet The polypropylene polymer beads were heated to a temperature of about 180° F. and subjected to a pressure of approximately 48 psig. The polymer beads were fluidized for 28 minutes in order to effect impregnation of the beads with air. After the impregnation fluidization, the resulting expandable polymer beads were transferred from the impregnation chamber to the holding chamber where they were maintained at a pressure of about 24 psig for a period of about 5 minutes. The resulting expandable polypropylene beads were then ready for use in a conventional polymer foaming and molding apparatus for forming shaped foamed polymer articles.

The preceding embodiments and example are set forth to illustrate specific embodiments of the invention and are not intended to limit the scope of the method and apparatus of the present invention. Additional embodiments and advantages within the scope of the claimed invention will be apparent to one of ordinary skill in the art.

What is claimed is:

1. A method for impregnating polymer beads, comprising providing polymer beads in an impregnation chamber at a temperature of from about 150° F. to about 200° F. and a pressure of from about 25 psig to about 100 psig, and simultaneously fluidizing the polymer beads in the impregnation chamber with an impregnating gas, wherein the impregnating chamber has a volume V and the impregnating gas is delivered to the impregnating chamber at a rate of about V/minute.

2. A method according to claim 1, wherein the impregnation chamber is at a pressure of from about 25 psig to about 30 psig.

3. A method according to claim 1, wherein the impregnation chamber is at a pressure of from about 30 psig to about 40 psig.

4. A method according to claim 1, wherein the impregnation chamber is at a pressure of from about 40 psig to about 50 psig.

5. A method according to claim 1, wherein the impregnation chamber is at a pressure of from about 50 psig to about 100 psig.

6. A method according to claim 1, wherein the impregnating gas comprises air, oxygen, carbon dioxide, or mixtures thereof.

7. A method according to claim 1, wherein the impregnating gas is air.

8. A method for impregnating polymer beads, comprising providing polymer beads in an impregnation chamber at a temperature of about 180° F. and a pressure of from about 25 psig to about 100 psig, and simultaneously fluidizing the polymer beads in the impregnation chamber with an impregnating gas, the impregnating gas being delivered to the chamber at a rate sufficient to cause individual polymer beads to be fluidized and for a time sufficient to impregnate the gas in the polymer beads.

9. The method of claim 8, wherein the polymer beads in the impregnation chamber are at a pressure of from about 25 to about 30 psig.

10. The method of claim 8, wherein the polymer beads in the impregnation chamber are at a pressure of from about 30 to about 40 psig.

11. The method of claim 8, wherein the polymer beads in the impregnation chamber are at a pressure of from about 40 to about 50 psig.

12. The method of claim 8, wherein the polymer beads in the impregnation chamber are at a pressure of from about 50 to about 100 psig.

* * * * *